(12) United States Patent
Medulla et al.

(10) Patent No.: US 11,294,427 B1
(45) Date of Patent: Apr. 5, 2022

(54) INTERACTIVE HEAD-MOUNTED DISPLAY

(71) Applicants: Christen K Medulla, Frisco, TX (US); Michael J Medulla, Frisco, TX (US)

(72) Inventors: Christen K Medulla, Frisco, TX (US); Michael J Medulla, Frisco, TX (US)

( * ) Notice: Subject to any disclaimer, the term of this patent is extended or adjusted under 35 U.S.C. 154(b) by 0 days.

(21) Appl. No.: 15/867,474

(22) Filed: Jan. 10, 2018

Related U.S. Application Data

(60) Provisional application No. 62/444,652, filed on Jan. 10, 2017.

(51) Int. Cl.
| | |
|---|---|
| *G06F 1/16* | (2006.01) |
| *H04M 1/02* | (2006.01) |
| *H04N 5/225* | (2006.01) |

(52) U.S. Cl.
CPC .......... *G06F 1/163* (2013.01); *H04M 1/0202* (2013.01); *H04N 5/2253* (2013.01); *H04M 2250/74* (2013.01)

(58) Field of Classification Search
CPC .... G06F 1/163; H04N 5/2253; H04M 1/0202; H04M 2250/74
See application file for complete search history.

(56) References Cited

U.S. PATENT DOCUMENTS

| | | | |
|---|---|---|---|
| 6,349,001 | B1 | 2/2002 | Spitzer |
| 7,013,009 | B2 | 3/2006 | Warren |
| 7,150,526 | B2 | 12/2006 | Jannard et al. |
| 7,405,881 | B2 | 7/2008 | Shimizu et al. |
| 8,405,573 | B2 | 3/2013 | Lapidot |
| 8,736,516 | B2 | 5/2014 | Jacobsen et al. |
| 8,957,835 | B2 | 2/2015 | Hellwarth |
| 9,310,613 | B2 | 4/2016 | Jaconsen et al. |
| 9,459,457 | B2 | 10/2016 | Murray et al. |
| 9,618,747 | B2 | 4/2017 | Villmer |
| 2006/0052146 | A1 | 3/2006 | Ou |
| 2006/0119539 | A1* | 6/2006 | Kato ................. G02B 27/0176 345/8 |
| 2009/0195479 | A1* | 8/2009 | Kato ..................... H04R 1/028 345/8 |
| 2010/0171680 | A1* | 7/2010 | Lapidot ............... G02B 27/017 345/8 |
| 2011/0169928 | A1* | 7/2011 | Gassel ................ H04N 13/044 348/53 |
| 2011/0187640 | A1 | 8/2011 | Jacobsen |
| 2012/0068914 | A1 | 3/2012 | Jacobsen et al. |
| 2012/0119978 | A1* | 5/2012 | Border ............... G02B 27/0172 345/8 |

(Continued)

*Primary Examiner* — Alexander Eisen
*Assistant Examiner* — Kebede T Teshome
(74) *Attorney, Agent, or Firm* — Leavitt Eldredge Law Firm

(57) ABSTRACT

An interactive head-mounted display includes a U-shaped headband that rests atop the crown of a user's head. At each end of the headband is an earpiece and a housing containing various electronics for operating and interacting with a designated wireless phone. Pivotally attached to an end of the headband is an arcuate, translucent shield that is suspended in front of the wearer's eyes. When wearing a connected device, a user can display on the shield any graphics generated by the phone, initiate a telephone call, transmit a text message, or initiate any other task that can be performed on the wireless phone, but without using the hands.

7 Claims, 2 Drawing Sheets

(56) References Cited

U.S. PATENT DOCUMENTS

| | | | |
|---|---|---|---|
| 2013/0021373 A1* | 1/2013 | Vaught | G02B 27/017 345/633 |
| 2016/0034042 A1* | 2/2016 | Joo | G06F 3/017 345/633 |
| 2016/0093105 A1 | 3/2016 | Rimon et al. | |
| 2016/0116746 A1* | 4/2016 | Bae | G02B 27/0172 345/8 |
| 2017/0123209 A1 | 5/2017 | Spitzer et al. | |

* cited by examiner

INTERACTIVE HEAD-MOUNTED DISPLAY

CROSS REFERENCE TO RELATED APPLICATIONS

This application is entitled to the benefit of provisional patent application No. 62/444,652 filed on Jan. 10, 2017, the specification of which is incorporated herein by reference.

BACKGROUND OF THE INVENTION

The present invention relates to an interactive, wireless head-mounted display that allows a user to completely operate, interact with and view video content from a wireless phone, the internet and other electronic devices without using the hands.

DESCRIPTION OF THE PRIOR ART

When performing certain tasks that require the use of one or both hands, operating a phone is extremely difficult. For example, if receiving an incoming call, the user must stop the task to free the hands, grasp the phone, manipulate one or more command buttons, then support the phone between the neck and face in order to return to the task. Depending upon the difficulty, the task may have to be completely discontinued until a phone or text conversation has concluded. If the user's hands are dirty, then the incoming call or text is typically ignored, sometimes causing the user to miss an important call or message.

Accordingly, there is currently a need for a device that allows a user to operate a wireless phone without using the hands. A review of the prior art reveals several devices that purportedly address some of the aforementioned problems. For example, U.S. Pat. No. 9,459,457 to Murray et al. discloses a head-mounted display including a head strap having and a mobile phone holder and a mirror for reflecting images displayed by the mobile phone.

U.S. Pat. No. 8,736,516 to Jacobsen et al. discloses a head-mounted display system including a head strap with a micro-display, a camera, a speaker and a microphone that can be used as a mobile phone or to display content from a remote mobile phone. Documents or texts can be retrieved from the mobile phone and depicted on the micro-display.

U.S. Pat. No. 7,013,009 to Warren discloses eyeglasses having a speaker, a microphone, and a transceiver thereon that allow a user to wirelessly transmit signals to and from a remote cell phone in order to place and receive calls.

U.S. patent publication no. 2006/0052146 to Ou discloses eyeglasses having mobile phone capabilities, including a means for displaying images on one or more of the lenses, a speaker, a microphone and a camera.

U.S. patent no. issued to Spitzer discloses eyeglasses having a camera integrated with one lens and a display unit integrated with the other. The eyeglasses may be used with a wireless phone for hands-free control.

U.S. Pat. No. 8,405,573 to Lapidot discloses a mobile phone that is electrically connected to a pair of eyeglasses.

U.S. Pat. No. 8,957,835 to Hoellwarth discloses a wireless phone that can be both physically and operatively connected with a head-mounted display to combine the features of both into a single unit.

Although the prior art includes head-mounted devices that allow a user to control certain cell phone features, many require a direct electrical connection between the cell phone and eyeglasses, which is cumbersome and inconvenient. Furthermore, wearing eyeglasses and a connected wireless phone is extremely awkward and uncomfortable. Irrespective of the connection method, each of the above-described devices depicts visual content on eyeglasses or other smaller displays that are difficult to see, impair forward vision and have limited graphic display capabilities. For example the device of patent no. '516 to Jacobson includes a small display screen that is positioned immediately adjacent to a wearer's eye, which is difficult to see and interferes with the wearer's ability to simultaneously perform other tasks.

Conversely, the present invention provides a head-mounted display that wirelessly interacts with a cell phone to depict a myriad of commands, messages or content on a transparent shield that wraps around both of a user's eyes. Accordingly, a wearer can easily observe depicted content while driving, working, exercising or performing any other task. The transparent shield forms a visor around the user's forehead or atop the head on which a projected image can be easily seen from any viewing angle and which does interfere with forward vision.

SUMMARY OF THE INVENTION

The present invention relates to an interactive head-mounted display comprising a U-shaped headband that rests atop the crown of a wearer's head. At each end of the headband is an earpiece and an attached housing containing various electronics for operating and interacting with a designated wireless phone or other electronic device. Pivotally attached to an end of the headband, near one of the housings, is an arcuate, translucent shield that is suspended in front of the wearer's eyes and nearly extends to the other housing. When the device is in communication with a wireless phone, a wearer can display on the shield any graphics generated by the phone, such as text messages, video, or incoming call information. The device also allows a wearer to make a telephone call, transmit a text or email message, schedule calendar events, or initiate any other task that can be performed on the wireless phone, using a voice-command module in lieu of the hands.

It is therefore an object of the present invention to provide a head-mounted display that wirelessly interacts with a designated phone.

It is therefore another object of the present invention to provide a head-mounted display that allows a wearer to operate a wireless phone without using the hands and to readily view graphical content generated thereby while safely and conveniently engaging in other activities.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
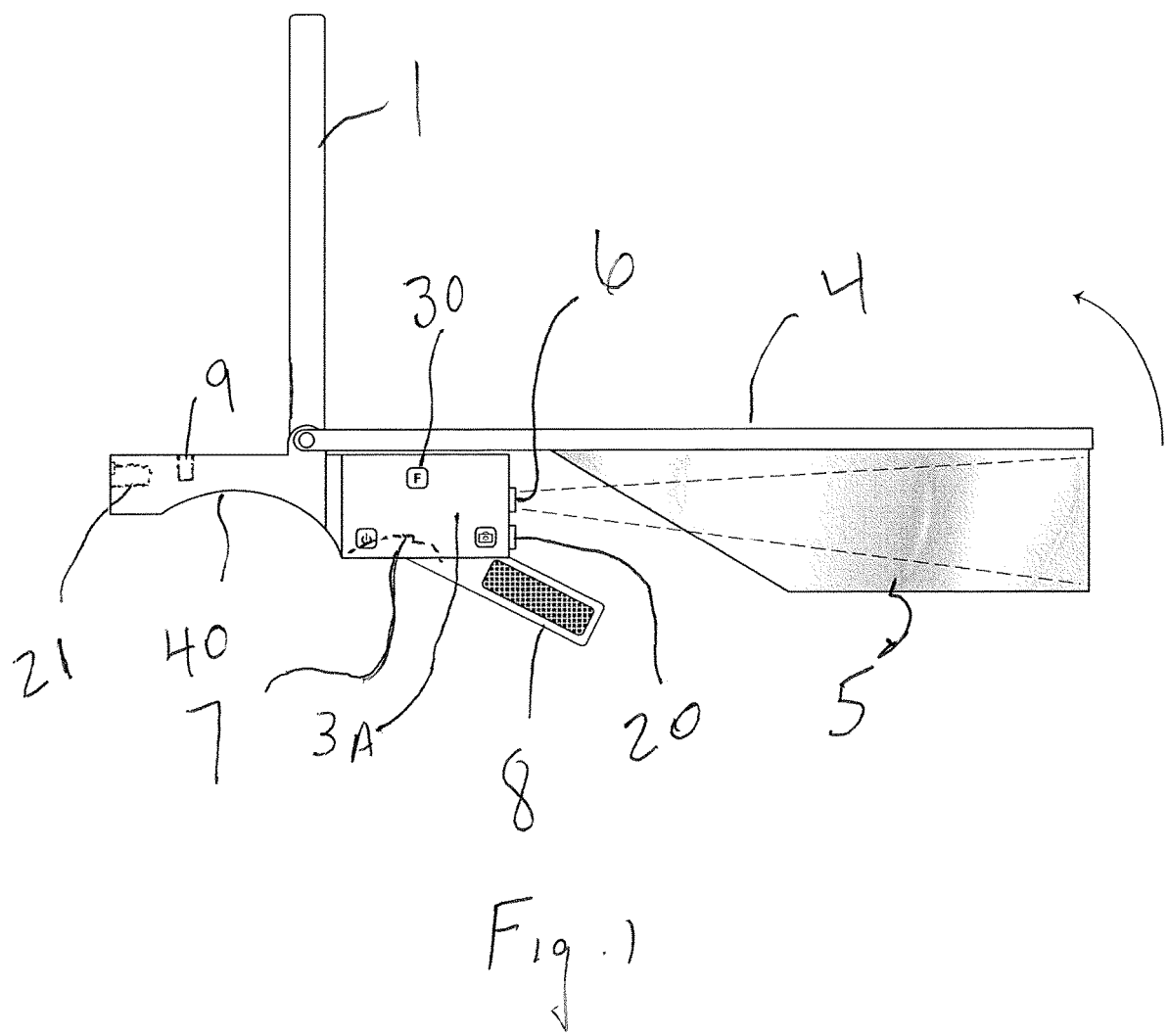
FIG. 1 is a side, plan view of the head-mounted display according to the present invention.
Figure 2:
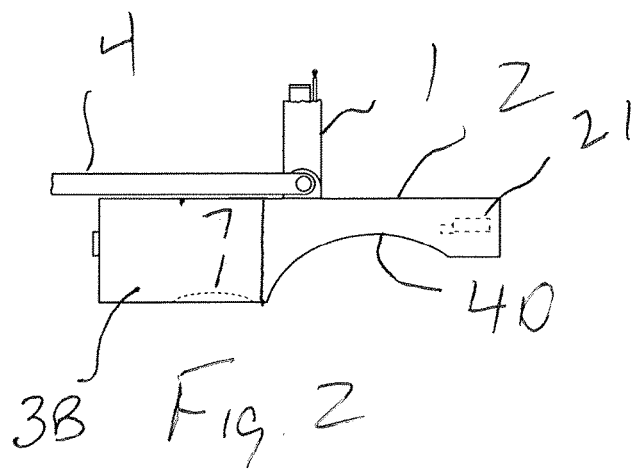
FIG. 2 is a side, cutaway view of the device.
Figure 3:
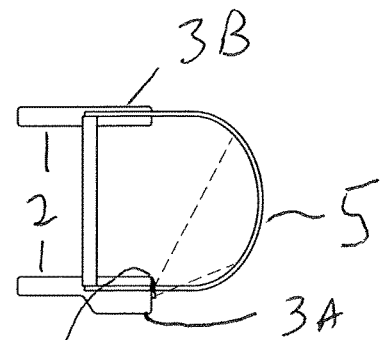
FIG. 3 is a top view of the device.

The present invention relates to an interactive head-mounted display comprising a U-shaped, foam-encapsulated headband 1 that rests atop the crown of a user's head. The headband is constructed with spring steel or a similar flexible but resilient material to fit about and grip varying-size heads. The headband includes two opposing ends, each having a cushioned earpiece 2 with a notch 40 that is adapted to conform to the top of a wearer's ear. Attached to each earpiece is a housing 3A, 3B having various electronics for operating and interacting with a designated wireless phone. Pivotally attached to the headband adjacent to one of the housings is an arcuate electronic-display module 4 including a translucent, metalized shield 5 that, when lowered, is suspended in front of the wearer's eyes whenever the headband is properly positioned atop a wearer's head. The shield extends around the front of the wearer's face and completely or almost to the opposing housing to form a semi-circular display screen in front of the wearer's eyes. The shield construction with a metalized rear surface forms a display screen having a transparency of about 85% to allow images to be clearly depicted thereon while not obstructing the wearer's view of a surrounding area.

Figure 4:
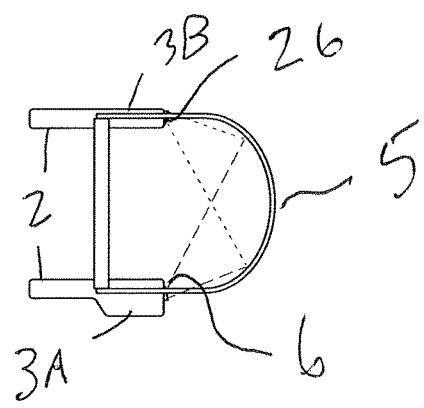
FIG. 4 is a top view of the device with a slightly different type of projector.
Figure 5:
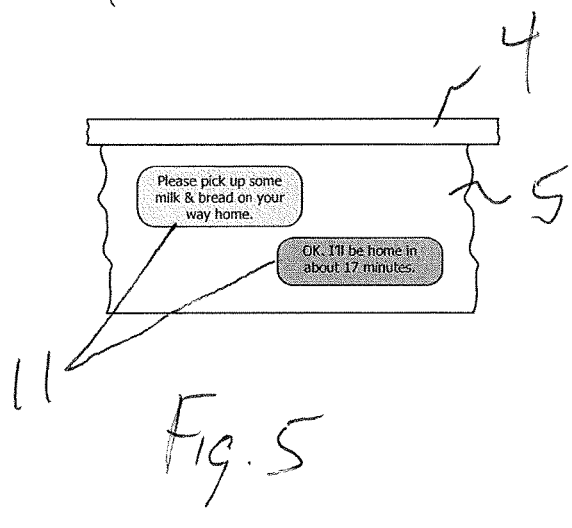
FIG. 5 is a sectional view of the shield with textual graphics being displayed thereon.

A first electronics housing 3A includes a wireless transmitter, a speaker 7 for emitting sounds from a connected wireless phone, a vibrating motor 21 for alerting a user of an incoming call or text from the connected wireless phone, a projector 6 for transmitting images from the phone to the shield, a camera 20 and a battery for powering the electronics. The wireless transmitter is preferably the type commonly marketed and sold under the trademark Bluetooth™ to allow the device to completely operate a connected wireless phone in a similar manner as if using the conventional local phone screen and handset commands. The other housing includes a processor, a speaker for emitting sounds from a connected wireless phone, an optional adjunct projector 26 and a vibrating motor 21 for alerting of incoming calls and texts. If two projectors are employed, their respective lens are coordinated to project a clearer, higher quality picture on the display shield as depicted in FIG. 4. A boom microphone 8 depends from one of the housings to allow the wearer to speak with others via a connected wireless phone or to issue voice commands thereto by depressing a designated button 30 on one of the housings. The button 30 activates a voice-command module within one of the housings to control various features of the wireless phone. One of the housings may also include an audio jack for connecting headphones when engaging in private telephone conversations. A charging cable can be connected to a USB port 9 to recharge the battery.

When the device is worn and is connected to a designated phone, the wearer can perform a myriad of tasks without occupying the hands. For instance, the wearer can display on the shield incoming text messages 11, driving directions, emails, videos, participate in virtual meetings using various communication software, and any other graphics that can be generated by the phone or the phone when connected to the internet. By initiating the voice-command application, the user can make a telephone call, transmit a text message, set times and alarms, setup a reminder, launch an application, access a website, play music or initiate any other task that can be performed using the wireless phone. Furthermore, the wearer can pivot the shield to an upright position, and photograph an object by depressing an adjacent command button 12 or by using a voice command. The photograph can subsequently be stored on and/or transmitted to the connected wireless phone.

Furthermore, when women wear the interactive display, the uniquely designed shield inconspicuously resembles a conventional headband; similarly, when men wear the device, it is easily concealed beneath a hat until needed. The unobstructive but easily viewable display allows a user to interact, for example, with a baby monitor while performing routine household chores. The unique design also allows golfers to incorporate range-finder technology into golfing head wear. Moreover, the device and connected phone can be easily communicate with a security system to allow the wearer to readily view live security-camera feed upon receiving an alert.

The above-described device is not limited to the exact details of construction and enumeration of parts provided herein. For example, though the device has been primarily described as being designed to wirelessly operate a phone, it can also be used to operate a video player, a golf range finder, a television, or any other similar electronic device. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. An interactive head-mounted display comprising:
a first earpiece body having a C shaped notch configured to fit around a top portion of a first ear of a wearer;
a second earpiece body having a C shaped notch configured to fit around a top portion of a second ear of the wearer;
a U-shaped headband secured to the first earpiece body at a top surface of the first earpiece body and extending from the first earpiece body at approximately a 90 degree angle, the U-shaped headband rests atop a wearer's crown, said headband having two opposing ends;
a housing attached to and extending from the first earpiece, the housing positioned below the U-shaped headband;
an arcuate translucent shield pivotally attached to both the two opposing ends of said headband, said shield movable between a lowered position where said shield is suspended in front of a wearer's eyes, and a raised position wherein the shield is positioned and aligned around and above the U-shaped headband, the lowered position extending relatively perpendicular to the U-shaped headband, the arcuate translucent shield is secured to the U-shaped headband above the housing;
a video projector secured to the housing and configured to project an image on the arcuate translucent shield;
a means within said housing for wirelessly controlling a wireless phone to remotely operate communication features of said wireless phone and to selectively depict video content from said wireless phone onto said shield where said video content is readily displayed in front of the wearer's eyes; and
a vibrating motor secured to the first earpiece body for alerting a user of an incoming call or text from the connected wireless phone.

2. The interactive head-mounted display according to claim 1 wherein said shield has a metalized rear surface to allow images to be depicted thereon while not obstructing the wearer's view of a surrounding area.

3. The interactive head-mounted display according to claim 1 wherein said headband is constructed with a resilient but pliable material to fit about and grip varying-size heads.

4. The interactive head-mounted display according to claim 1 further comprising a camera attached to said housing to allow a user to record and transfer images to said wireless phone.

5. The interactive head-mounted display according to claim 1 wherein said means within said housing for wirelessly controlling a wireless phone to operate communication features of said wireless phone comprises a voice-command module in communication with said wireless phone.

6. The interactive head-mounted display according to claim 5 further comprising a microphone attached to said housing and in communication with said voice-command module.

7. The interactive head-mounted display according to claim 1 further comprising a second video projector attached to a second housing, a lens of said projector and a lens of said second projector coordinated to project a clear, high quality picture on said shield.

\* \* \* \* \*